(No Model.)

S. P. BLACKMORE.
ROCK OR LIKE DRILL.

No. 602,693. Patented Apr. 19, 1898.

WITNESSES:
Arthur Ashley
A. M. Kennedy

INVENTOR
S. P. Blackmore
BY
P. T. Dodge
ATTORNEY.

UNITED STATES PATENT OFFICE.

SIDNEY PRATT BLACKMORE, OF JOHANNESBURG, SOUTH AFRICAN REPUBLIC, ASSIGNOR OF TWO-THIRDS TO RICHARD OLIVER GARDNER DRUMMOND AND EDWARD JOHN WAY, OF SAME PLACE.

ROCK OR LIKE DRILL.

SPECIFICATION forming part of Letters Patent No. 602,693, dated April 19, 1898.

Application filed September 2, 1897. Serial No. 650,317. (No model.)

*To all whom it may concern:*

Be it known that I, SIDNEY PRATT BLACKMORE, a subject of the Queen of Great Britain, residing at Johannesburg, in the South African Republic, have invented new and useful Improvements in Rock or Like Drills, of which the following is a specification.

The invention relates to percussive rock and other like drills capable of being operated either by manumotive, electromotive, or other power. It is designed with the object of providing a simple and at the same time efficient means for converting the rotary motion of the motor or driving part of the drill into the necessary percussive reciprocating motion of the drill-bit through the drill bar or shaft.

The invention consists in the improved arrangement and form of the drill-shaft and the actuating mechanism, as will be described, and pointed out in the claims.

The invention will be further and fully described by means of the accompanying drawings, in which—

Figure 4:
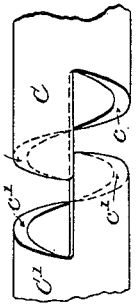
Figure 1:
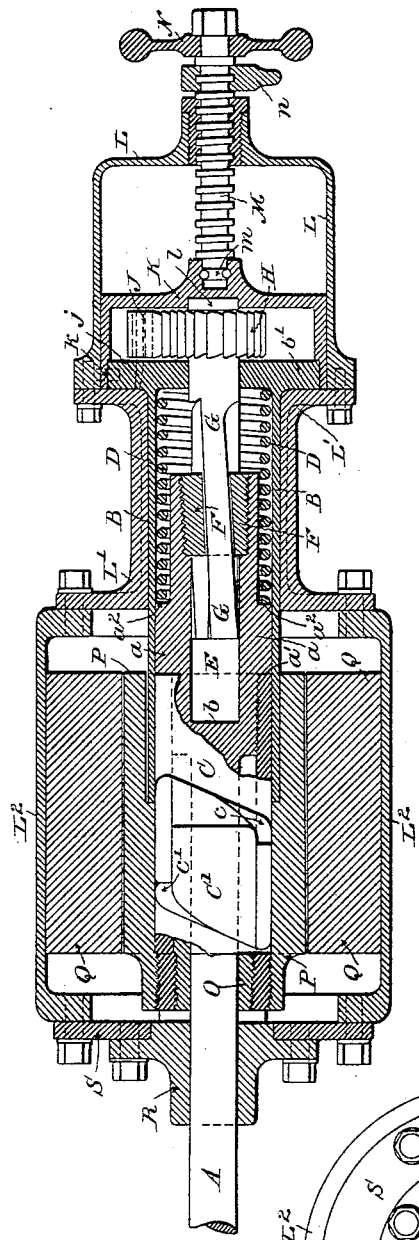
Figure 2:
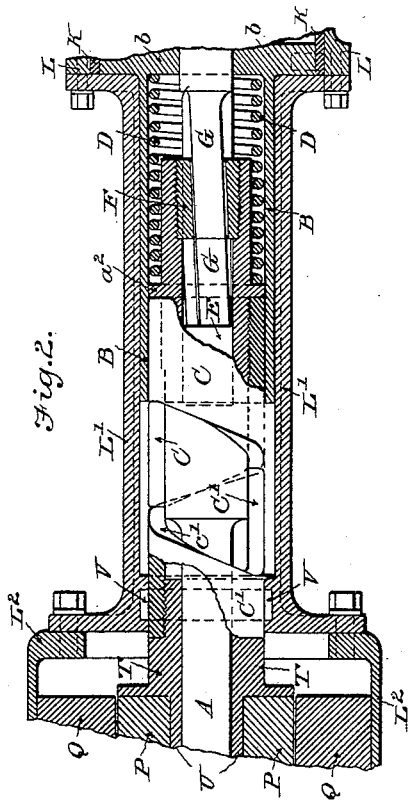
Figure 3:
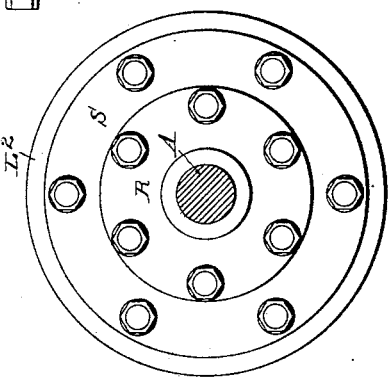

Figure 1 is a longitudinal sectional elevation of a rock-drill constructed in accordance with this invention; Fig. 2, a longitudinal sectional elevation of a portion of same, showing a modified arrangement; Fig. 3, an elevation from the motor end of the drill; Fig. 4, a detached view of a portion of the cylindrical cams C C' drawn asunder, showing the spiral or approximately spiral cam or screw surfaces $c\ c'$.

The corresponding parts in the several figures of the drawings are indicated by the same letters of reference.

In the arrangement shown in Fig 1, A is the drill bar or shaft, the shank or extremity of which is formed with a boss $a$. The boss $a$ is formed of approximately the same diameter as the internal diameter of the cylindrical casing B, in which it is capable of sliding freely to and fro. The boss $a$ is turned down to form shoulders thereon at $a'\ a^2$. The turned-down portion $b$ of the boss $a$ is screwed to receive the cylindrical cam or hollow cylindrical piece C, formed with a spiral or approximately spiral cam or screw surface $c$. The construction of the cylindrical cams C C' is more clearly shown in Fig. 4, which is a view of the same drawn asunder and showing the spiral cam or screw surfaces $c\ c'$. The cylindrical cam C is tapped to correspond with the portion $b$ of the boss $a$, onto which it is screwed. The shoulder $a'$, up to which the cam C is screwed, takes up the thrust and prevents the possibility of the stripping of the screw-thread. Between the shoulder $a^2$ on the shank of the drill and the cover $b'$ on the end of the cylindrical casing B a preferably spiral spring D is inserted.

The extremity of the shank of the drill is bored out centrally at E, as shown, and is partially tapped to receive the rifle-nut F, through which the ordinary rifle-bar G works to impart the requisite twist or rotary motion to the drill-bit. The cavity E is made sufficiently deep to permit of the stroke of the drill. The end of the rifle-bar G projects through the flanged cover $b'$ of casing B, which forms a bearing for it, and has keyed or otherwise attached to it the ratchet or leaf wheel H. The pawls J are pivoted in gear with wheel H on pins $j$, passing into the flange of cover $b'$. A cup-shaped piece K, capable of sliding in the exterior cylindrical casing L, is pinned or keyed, as at $k$, to the flange $b'$ and forms a bearing at $l$ for the extremity of the rifle-bar G.

For the purpose of adjusting the tension of the spring D a screw M, passing in through the end of casing L, is attached to the cup-shaped piece K by means of the pin $m$. An operating-wheel N is attached to the screw M, and a lock-nut or locking device $n$ is provided for locking the screw in any desired position. As the parts are drawn forward or forced backward by means of screw M to regulate the tension of the spring D the casing B slides freely within the part L' of the exterior casing of the drill. The other cylindrical cam C', which is a counterpart of the cam C, attached to the drill-shaft A, is screwed into the hollow armature or rotor P of the motor and is provided with a bush O, which forms the bearing for the rotating part of the motor. P is the rotor and Q the stator of a preferably polyphase electric motor coupled up with the dynamo or other generator of electricity. The motor is inclosed by the part $L^2$ of the exterior casing. The cap R, which forms the bearing for the drill-bar A, is affixed to the annular piece S, bolted to the casing $L^2$.

In Fig. 2 an arrangement is shown in which the cylindrical cams C C' are mounted on the drill-bar A at the exterior of the motor. The cam C' is screwed or otherwise conveniently attached to the extension-piece or continuation T of the hollow armature or rotor shaft U of the motor. A packing-ring V is provided to prevent the passage of the lubricant from the external casing L', in which the cams work, into the interior of the motor-casing $L^2$. The several other parts in this arrangement are similar to those previously described with reference to Fig. 1.

It will be evident that the cam or screw surfaces c c' might be formed on a solid instead of a hollow cylinder, as shown, and be attached to their respective parts by means of suitable exterior devices, and that in lieu of the spiral spring D a pneumatic or air spring might be employed.

If desired, any suitable form of differential gearing may be interposed between the driving and driven parts of the drill.

Although the drill shown in the drawings is designed to be driven by means of an electric motor, it will be obvious that by substituting for the motor other suitable means motion may otherwise be imparted to the operative parts of the drill.

In operation as the armature or rotor P of the motor, carrying with it the cylindrical cam C', is rapidly rotated around the drill-shaft A the other cam C, and with it the drill-shaft A, is forced backward, being prevented rotating with the armature or rotor P by the rifle-bar G, and the buffer-spring D gradually compressed until the cam C has reached its limit of stroke or maximum point of expansion, when it is propelled or forced forward by the sudden expansion of the spring D, and the requisite percussive motion thereby imparted to the drill-bit through the drill-shaft A.

Having fully described my invention, what I claim, and desire to secure by Letters Patent, is—

1. In a rock-drill the combination with the frame, of the reciprocating drill-shaft mounted therein, the shell C mounted on said shaft and surrounding the same and formed with a spiral cam-surface, the stator Q mounted in the frame and also surrounding the drill-shaft, the rotor P mounted within the stator and surrounding the shaft, the shell C' fixed to the rotor and surrounding the drill-shaft beyond the shell C and formed with a spiral cam-surface abutting against the cam-surface on the shell C.

2. In combination, the drill-shaft A, the boss $a$ formed thereon and forming the shoulders $a'$ $a^2$, the cylindrical cam C, screwed onto the shaft A up to the shoulder $a'$, the corresponding cylindrical cam C' screwed within the rotor P, the bush O screwed within the cam C' and forming the bearing for the rotating part of the motor, the rotor P and stator Q, comprising the electric motor mounted concentrically on the drill-shaft A, the spiral spring D inserted within the cylindrical casing B and bearing against the shoulder $a^2$ formed on the drill-shaft, the cylindrical casing B and its cover $b'$ against which the spring D bears the cavity E formed in the inner extremity of the drill-shaft A, the rifle-nut F screwed therein, the rifle-bar G passing through the rifle-nut and projecting into the cavity E, the ratchet or leaf wheel H attached to the end of the rifle-bar G, the pawl J, the cup-shaped piece K attached to the cover $b'$ of the cylindrical casing B for regulating the tension of spring D, the adjusting-screw M fitted with a locking device, operating-handle N, and the several parts L L' $L^2$, annular piece S and cap R of the exterior casing substantially as described and shown.

3. In a drill the combination with the frame, of the drill-shaft A, the concentric cylindrical cam C attached thereto near its rear end, the stator Q surrounding the drill-shaft near its forward end, the rotor P mounted within the stator, the rotor-shaft surrounding the drill-shaft and provided with a rearward extension T, the cylindrical cam C' fixed to said extension in rear of stator Q and abutting against the cam C, and the packing-ring V surrounding the cam C'.

4. In combination, the drill-shaft A, the boss $a$ formed thereon and forming the shoulders $a'$ $a^2$, the cylindrical cam C, screwed onto the shaft A up to the shoulder $a'$, the corresponding cylindrical cam C' gearing therewith attached to the extension-piece or continuation T of the hollow armature or rotor shaft U of the motor, the rotor P and stator Q mounted concentrically on the drill-shaft A the rotor-shaft U and the extension T thereof, the packing-ring V, the spiral spring D inserted within the cylindrical casing B and bearing against the shoulder $a^2$ formed on the drill-shaft, the cylindrical casing B and its cover $b'$ against which the spring D bears the cavity E formed in the inner extremity of the drill-shaft A, the rifle-nut F screwed therein, the rifle-bar G passing through the rifle-nut and projecting into the cavity E, the ratchet or leaf wheel H attached to the end of the rifle-bar G, the pawl J, the cup-shaped piece K attached to the cover $b'$ of the cylindrical casing B for regulating the tension of spring D, the adjusting-screw M fitted with a locking device, operating-handle N, and the several parts L L' $L^2$, of the casing of the drill substantially as described.

In witness whereof I have hereunto set my hand, in presence of two witnesses, this 22d day of July, 1897.

SIDNEY PRATT BLACKMORE.

Witnesses:
  G. I. FISCHER,
  CHAS. OVENDALE.